US007559539B2

United States Patent
Zich et al.

(10) Patent No.: US 7,559,539 B2
(45) Date of Patent: Jul. 14, 2009

(54) STACKED PACKING FOR HEAT EXCHANGE AND MASS TRANSFER

(75) Inventors: Egon Zich, Leichlingen (DE); Helmut Jansen, Dormagen (DE); Thomas Rietfort, Bottrop (DE); Björn Kaibel, Hilden (DE)

(73) Assignee: Julius Montz GmbH, Hilden (DE)

( * ) Notice: Subject to any disclaimer, the term of this patent is extended or adjusted under 35 U.S.C. 154(b) by 496 days.

(21) Appl. No.: 10/572,538

(22) PCT Filed: Jul. 24, 2004

(86) PCT No.: PCT/EP2004/008328

§ 371 (c)(1),
(2), (4) Date: Mar. 17, 2006

(87) PCT Pub. No.: WO2005/037428

PCT Pub. Date: Apr. 28, 2005

(65) Prior Publication Data

US 2007/0036957 A1 Feb. 15, 2007

(30) Foreign Application Priority Data

Sep. 20, 2003 (DE) ................................ 103 43 650

(51) Int. Cl.
*B01F 3/04* (2006.01)

(52) U.S. Cl. .................... 261/97; 261/110; 261/DIG. 72
(58) Field of Classification Search ................... 261/94, 261/95, 97, 110, 112.1, 112.2, DIG. 72
See application file for complete search history.

(56) References Cited

U.S. PATENT DOCUMENTS

| 3,738,626 | A | * | 6/1973 | Norback ................... 261/112.2 |
| 4,708,832 | A | * | 11/1987 | Norback ...................... 261/153 |
| 4,842,778 | A | * | 6/1989 | Chen et al. ..................... 261/97 |
| 5,518,667 | A | * | 5/1996 | Lehman ........................ 261/97 |
| 5,725,810 | A | * | 3/1998 | Brunner et al. ........... 261/112.2 |
| 5,876,638 | A | * | 3/1999 | Sunder et al. ............. 261/112.2 |
| 5,984,282 | A | * | 11/1999 | Armstrong et al. ........ 261/112.2 |
| 5,997,173 | A | * | 12/1999 | Ingram et al. ................ 366/337 |
| 6,397,630 | B1 | * | 6/2002 | Fraysse et al. ................. 62/643 |
| 6,425,574 | B1 | * | 7/2002 | Sunder ........................ 261/94 |
| 6,427,985 | B1 | | 8/2002 | Kaibel et al. |
| 6,991,222 | B2 | * | 1/2006 | Meski et al. ................... 261/94 |
| 2003/0090009 | A1 | * | 5/2003 | Zich et al. ..................... 261/97 |

\* cited by examiner

*Primary Examiner*—Scott Bushey
(74) *Attorney, Agent, or Firm*—Andrew Wilford

(57) ABSTRACT

A stacked packing for a heat-exchange or mass-transfer column has a horizontal upper packing part and a horizontal lower packing part below the upper part. This lower part is formed of a plurality of upright layers, some of which are of substantially greater density and have a greater surface area than others.

12 Claims, 3 Drawing Sheets

STACKED PACKING FOR HEAT EXCHANGE AND MASS TRANSFER

CROSS REFERENCE TO RELATED APPLICATIONS

This application is the US national phase of PCT application PCT/EP2004/008328, filed 24 Jul. 2004, published 28 Apr. 2005 as WO2005/037428, and claiming the priority of German patent application 10343650.2 itself filed 20 Sep. 2003, whose entire disclosures are herewith incorporated by reference.

FIELD OF THE INVENTION

The invention relates to a stacked packing for a heat-exchange or mass-transfer column with at least one packing comprised of several layers.

BACKGROUND OF THE INVENTION

In EP 1 074 296 (U.S. Pat. No. 6,427,985) a stacked packing is described where the individual packings are each formed of two separate packing layers of different geometry. Here the lower packing part is of tighter geometry than the upper packing part. The packing is operated such that the lower packing part is made to bubble with high mass transfer. The overlying coarser packing layer separates out the bubbles and has film flow so that it works like a conventional packing.

When such a packing is used, it is very sensitive when not set perfectly horizontally, especially when the column diameter is greater than 1 m. When tipped there is uneven liquid distribution across the column. Thus there are liquid-filled zones with lower gas throughput. This nonuniformity has a bad effect on the otherwise high separation capacity.

OBJECT OF THE INVENTION

It is an object of the invention to provide a packing of the named type that produces uniform liquid distribution over the flow cross-section of the column.

SUMMARY OF THE INVENTION

This object is achieved according to the invention in that some layers of the lower packing part are of greater density and therefore have a greater surface area than other layers of the lower packing part.

It has been discovered that the sensitivity to nonuniform distribution can be greatly reduced when the geometry of the tight flooded packing layers is modified. In contrast to conventional column packings, the packing according to the invention does not have uniform geometry of the individual layers of the lower part, but this changes horizontally, vertically, or preferably both horizontally and vertically. The packings are used such that the lower packing part always has a bubble action with high mass transfer and the overlying coarser packing part acts as a drop separator and has the liquid film of conventional packings.

The packing layers with greater density and, hence, greater surface area resist the passage of gas up through them so the gas moves upward more slowly and the liquid in these layers is pushed downward more strongly. In this manner inside the packing layer there is liquid and gas recirculation leading to an optimal distribution of the liquid. This also ensures that the liquid moves downward in sufficient volume.

BRIEF DESCRIPTION OF THE DRAWING

Embodiments of the invention are shown in the drawing and described more closely in the following, therein.

SPECIFIC DESCRIPTION

A column holds several packing assembles extending horizontally one above the other. The assemblies each have one or more packings 1 that are each formed of an upper packing part 2 and a lower packing part 3.

Figure 1:
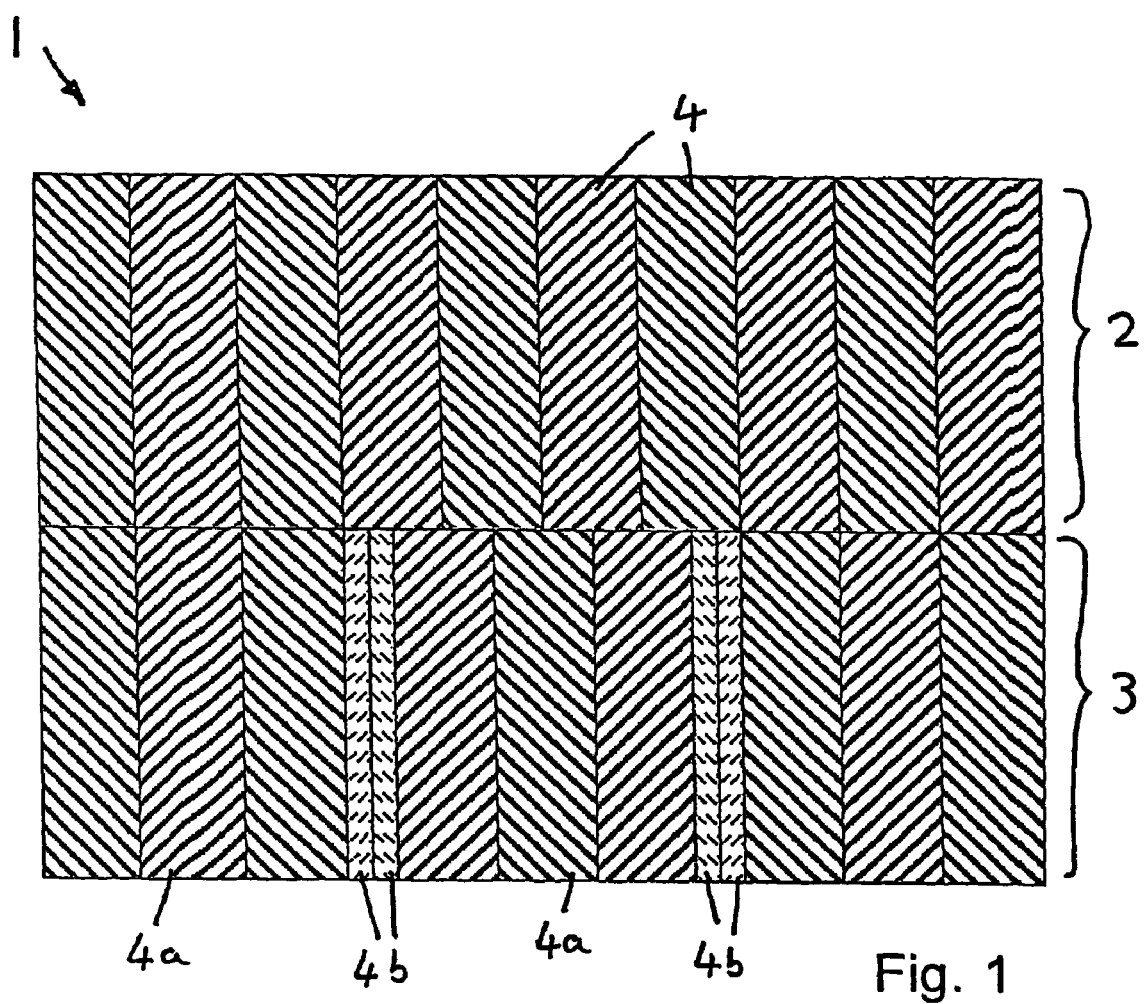
FIG. 1 is a first embodiment of a packing or packing assembly in section.

The first embodiment of FIG. 1 has a conventional cross-channel upper part 2 whose individual packing layers 4 have the same geometry and same specific surface area horizontally and vertically. The upper packing part 2 is of lesser density and has a smaller specific upper surface area. The lower packing part 3 is of greater density and has a greater specific surface area.

Figure 2:
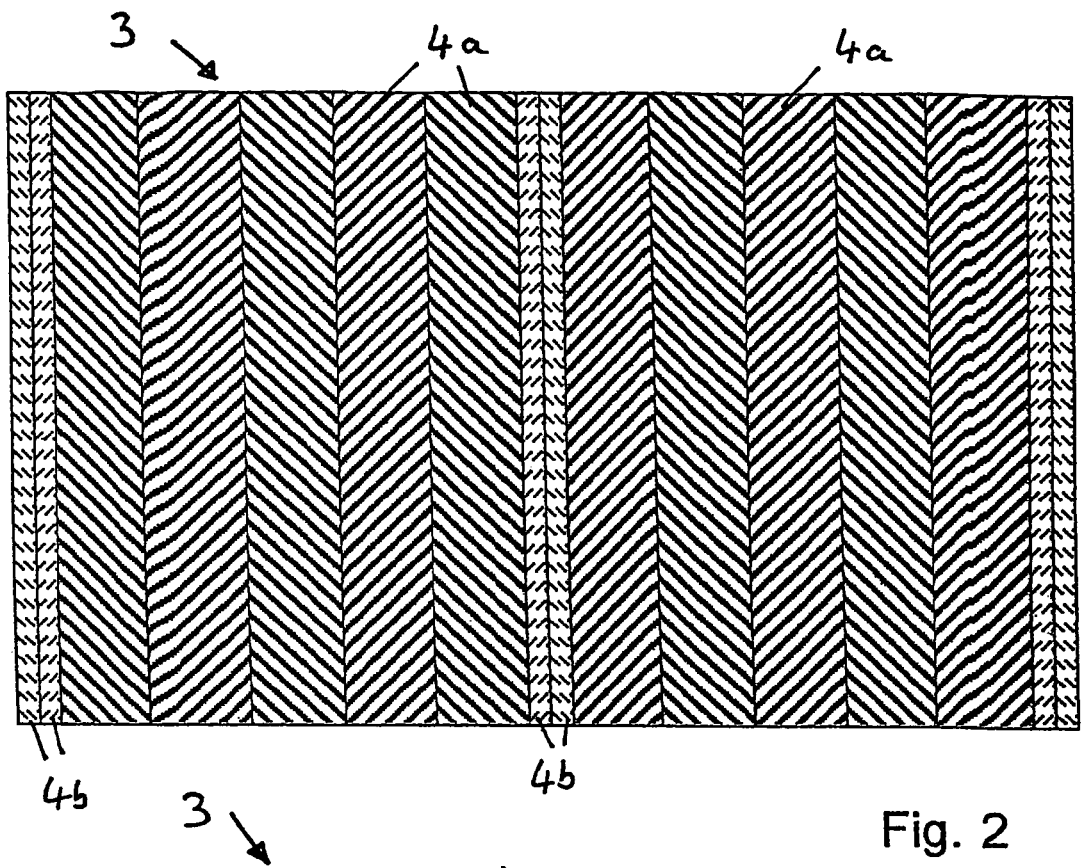
FIG. 2 is a second embodiment of a packing or packing assembly in section.

FIGS. 1 and 2 are sections of the packings according to the invention where the lower packing part 3 has packing layers 4a and 4b oriented horizontally and having at least two different gross specific surface areas. As a rule the two thinner denser packing layers 4b with the greater specific surface area are directly against each other. Between these paired layers 4b with the larger specific surface area there are 1 to about 10, preferably 3 to 6, adjacent layers 4a of smaller specific surface area.

The specific surface area of the layers 4a with the smaller specific surface area corresponds in the art with standard geometry to a specific surface area of about 100 to 1200 $m^2/m^3$.

The layers 4b with the greater specific area have a specific surface area that is bigger by a factor of 2. The basis for this very large specific surface area lies in the insert deflecting function used in standard distillation systems.

While the coarse packings effect a counterflow of gas and liquid with bubble formation, the interstices of the packing layers 4b with the greater specific surface are preferably only or primarily traversed by liquid. In these liquid-filled interstices there is good distribution of a portion of the liquid flow and uniform distribution. Such packing parts 3 are therefore effective as flow spreaders. They render partially or wholly unnecessary the provision of liquid collectors and distributors.

Astonishingly, experiments have shown that in the layers 4b the liquid goes very freely into the narrow flow passages and is distributed uniformly along these passages.

The tight and dense packing layers 4b can be made of different materials that have perforations, for example sheet metal, expanded metal, or wire mesh.

For bubbling action in the lower packing part 3 it is necessary that the two packing layers 4a and 4b have perforations over 10 to 50% of their height so as to permit passage of liquid out of the narrow interstices into wider passages. The wider openings thus take up from 5 to 20% of the overall surface area of the packing layer.

Figure 3:
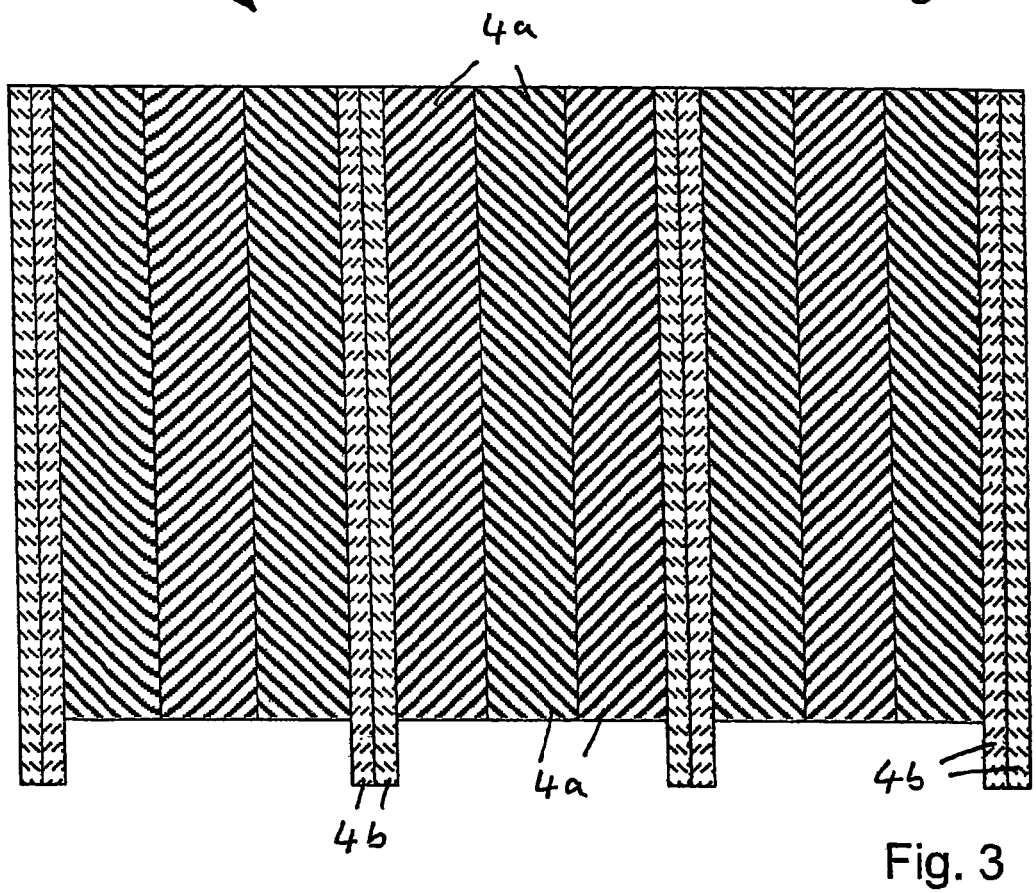
FIG. 3 is a third embodiment of a packing or packing assembly in section.
Figure 4:
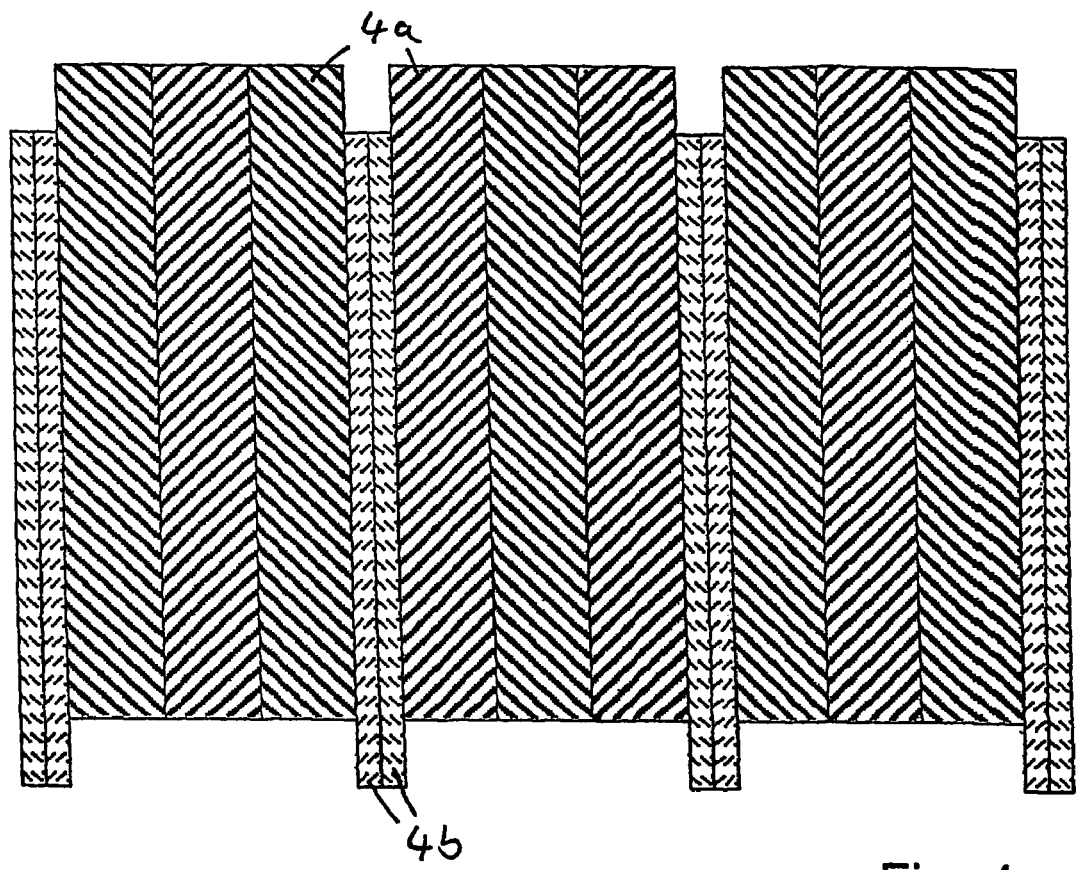
FIG. 4 is a fourth embodiment of a packing or packing assembly in section.

It has been shown (see FIGS. 3 and 4) to be particularly advantageous when the denser packing layers 4b project from the lower end of the tight packings about 2 to 50 mm, preferably 5 to mm, while all the layers 4*a* and 4*b* are flush at the upper side (FIG. 3) or of different heights at the upper side (FIG. 4).

The invention claimed is:

1. A stacked packing for a heat-exchange or mass-transfer column, the packing comprising
   a horizontal upper packing part; and
   a horizontal lower packing part below the upper part and formed of a plurality of upright layers, some of the layers of the lower part being of substantially greater density and having a greater surface area than others of the layers.

2. The packing according to claim 1 wherein the lower packing part is of greater density and has a larger surface area than the upper packing part.

3. The packing according to claim 1 wherein the packing layers of higher surface area have a surface area that is 2 times the gross specific surface area of the other packing layers.

4. The packing according to claim 1 wherein the packing layers of greater surface area are arrayed in pairs in which they lie directly against each other and between these pairs of layers of greater surface area there are 1 to 10 layers with a smaller surface area.

5. The stacked packing according to claim 1 wherein the packing layers with the larger surface area are made of materials that have perforations.

6. The packing according to claim 1 all the layers have at their lower regions over about 10 to 50% of their height perforations in greater number or of greater diameter that permit passing of fluid.

7. The packing according to claim 1 wherein a free flow cross section is about 5 to 20% of the overall surface area of the packing layer.

8. The packing according to claim 1 wherein the tight packing layers project downward from a lower face of the lower packing about 2 to 100 mm.

9. The packing according to claim 1 wherein the packing layers of greater surface area project at their lower ends about 2 to 50 mm, and are set at their upper ends about 2 to 100 mm deeper than the other packing layers.

10. The stacked packing defined in claim 1 wherein the layers are transverse to the horizontal.

11. The stacked packing defined in claim 10 wherein the layers are perpendicular to the horizontal.

12. The stacked packing defined in claim 10 wherein the layers extend vertically through the lower part.

* * * * *